United States Patent [19]

Sperberg

[11] 3,863,696

[45] Feb. 4, 1975

[54] MINI-PLY IMPROVED PNEUMATIC TIRES
[76] Inventor: Lawrence R. Sperberg, 6740 Fiesta Dr., El Paso, Tex. 79912
[22] Filed: Oct. 5, 1972
[21] Appl. No.: 295,142

Related U.S. Application Data
[63] Continuation of Ser. No. 102,023, Dec. 28, 1970, abandoned, which is a continuation of Ser. No. 695,932, Jan. 5, 1968, abandoned.

[52] U.S. Cl. ............................. 152/356, 152/361 R
[51] Int. Cl. ............................................. B60c 9/06
[58] Field of Search .......... 152/361 R, 361 FP, 356, 152/354

[56] References Cited
UNITED STATES PATENTS
3,386,487   6/1968   Massoubre ..................... 152/361 R
FOREIGN PATENTS OR APPLICATIONS
1,435,170   3/1966   France ............................. 152/361

Primary Examiner—M. Henson Wood, Jr.
Assistant Examiner—George H. Libman
Attorney, Agent, or Firm—Marcus L. Bates

[57] ABSTRACT

A reinforcing means in the form of a mini-ply for a bias or radially constructed tire. The mini-ply is comprised of spaced apart circumferentially extending reinforcing small plies or strips which are situated adjacent to the exterior or buried within the main carcass plies of the tire. Each spaced apart mini-ply is located in a particular area of the tire which structurally improves the tire at its weakest point, thereby improving the stability and profile of the tire. Each spaced apart mini-ply is fabricated from one or more plies. Where more than one ply is used in the mini-ply, each ply may be oppositely biased and placed closely adjacent to each other and in close proximity to and coextensive with the main carcass plies. The variations in the mini-ply structure together with the variations in the main carcass structure offer a multitude of different tire structures, each of which imparts the new tire with a different desirable property.

13 Claims, 11 Drawing Figures

INVENTOR.
LAWRENCE R. SPERBERG
BY
MARCUS L. BATES

MINI-PLY IMPROVED PNEUMATIC TIRES

This application is a continuation of now abandoned Ser. No. 102,023 filed Dec. 28, 1970, which in turn was a continuation of now abandoned Ser. No. 695,932 filed Jan. 5, 1968.

BACKGROUND OF THE INVENTION

In recent years the reduced ply bias constructed tire such as the two ply passenger tire and the four ply – 12 ply rating truck tire for example has become acceptable as original equipment on newly produced automobiles and trucks and has also found wide acceptance as a replacement tire with the consumer because of a combination of desirable properties and lower price. Realizing that the reduced ply tire may be inferior for high speed and heavy duty work, the average consumer has nevertheless shown a liking for this tire. But the two ply original equipment auto and four ply truck tire for example, have lately fallen into disrepute for high speed turnpike usage due to failures of both the tread wearing and durability variety. The tire also exhibits a poor wear profile, and has a fatigue failure rate which exceeds the more expensive four or eight ply constructed tires.

The radially constructed tire has also recently grown in popularity because of its excellent wear performance or resistance to abrasion. However, the major problem that the automotive tire industry is confronted with as the use of the presently available radial tires becomes more widespread in higher powered vehicles will be the development of radial cracks in the lower buttress area. When these cracks penetrate through the tire body the tire is rendered useless. This type of failure is literally unknown in Europe, even in the truck tire field, because the above mentioned low power equipment that presently utilizes the current radial tire fails to exert enough torque to cause tires to fail for this reason. Since the American automobile carries up to 430 cu. in. displacement and the American trucks often exceed 350 H.P., the present radial tire configuration cannot be successfully operated because of the high mortality rate brought about by the radial cracks. Thus this weakness can overcome all of the other advantages associated with this remarkable tire.

Another common and prevalent type of failure that occurs when radial tires are placed in service on highly powered equipment is the more rapid development of separation between the plies of the steel belt that encompasses the radial plies. Steel tire cord has a very poor adhesive strength ranging from one half to one third of other commercially acceptable tire cord materials. This adhesion defect is aggravated by the increased shear developed in traction when using high powered equipment and separations in the belt construction result when the force transmitted by the radial cords and thence to the belt plies, becomes intolerable to the belt ply rubber insulating material.

Since the manufacturer of the low cost reduced ply tire has only two or four plies to work with, he is limited in scope so far as regards designing desirable features into the tire as compared to the larger pneumatic auto and truck tires having four plies and possibly several breakers located therein. Furthermore, the addition of breakers to the reduced ply tire greatly increases the cost of manufacture, and diminishes many of its desirable attributes.

The tire testing industry generally recognizes that survival of the reduced ply tire depends upon improvement of these characteristics along with added directional, passing, and turning stability. On the other hand, the reduced ply tire has inherent desirable characteristics which are not found in the large multi ply tire. The thinner wall permits cooler running characteristics as well as enabling more dynamic stability to be originally built into the tire — i.e., non-uniformity.

The thinner wall, however, does not enable optimum tire profile to be achieved and consequently the type of wear exhibited by the reduced ply tire differs from the larger multi ply tire in that pronounced shoulder scuffing wears the two ply auto tire into a very rounded pattern until the shoulder ribs are entirely removed, whereas the more expensive multi ply tire maintains its profile and exhibits a more uniform wear in this region.

As in the above examples, there is a trend towards fabricating tires, such as the four-ply bias constructed truck tire, and designating the tires as having a 12 ply rating. This rating is sometimes upgraded by the provision of breakers or a girdle belt about the other periphery of the tire. Hence, it is generally believed that the better, lighter-weight tire is more desirable than the larger, heavier more complex tires because of its greater ability to dissipate heat. However, contrary to industry's expectations, the lighter weight or reduced ply tire has not in many ways performed as well as the larger tire. This is also true of the radially constructed tire. In the radially constructed tire various configurations of the girdle belt have been employed in an attempt to maintain the inherent desirable properties presented by the radial construction, while at the same time attempting to offset radial sidewall cracking and shoulder separations.

Furthermore, the great bulk of both nylon and rayon reduced ply bias and radially constructed tires exhibit separation type failures. This separation type failure is due to the greater flexibility of the tire, which also accounts for its cooler running temperature — that is, the thinner carcass itself.

Separation and rupture failures in the reduced ply thin tires result from the sharp bend which is formed in the shoulder where the tire tread breaks away from the road surface. This extreme flex area causes extreme fatigue of the tire cord material and generates excessive localized heat, although the heat is rapidly dissipated through the thin wall of the tire. Elimination of this sharp bend and control of the tire profile are necessary in order to enable the reduced ply tire to exceed the performance of other, more expensive and complex tires.

The sharper bending angle in the tire shoulder was first noticed with nylon truck tires when nylon was gradually replacing rayon as the principal tire cord in the field of vehicle tires. Several years' accumulated data of road test results using truck tires that were fabricated with nylon cords show failure patterns unlike any that were associated with previous tests of rayon tire cords. The failure of nylon truck tire cords may be attributed to nylon fusion. Test data show conclusively that this fusion of the nylon cord is a direct result of the intense heat build-up on the inside of the tire. In a truck tire the presence of nylon fusion is especially of interest since a truck tire is normally subject to more severe usage than is a passenger or automotive tire; consequently, nylon fusion is more prominent in the truck tire industry, and it is assuming the stature of a major problem in passenger tires because of the many lawsuits filed wherein said delitescent defect is a major cause of failure.

The problem of nylon fusion is particularly dangerous in addition to being expensive for the fusion cannot be detected by one unskilled in the art since close examination of the tire interior is required to detect the beginning of the fusion process. Usually the occurence of the nylon fusion, or at least the effects thereof, is realized when the tire explodes. The problem is well hidden for it required several hundred attempts by patentee in a carefully controlled test program to discover the reason for this phememenon. The problem is becoming acute and is beginning to be recognized as the source of great loss of life and property, for one may be driving along at a low rate of speed in close proximity to pedestrians and experience a violent tire explosion. This explosion may occur at any speed, after any length of driving, under almost any severity of driving conditions.

There is an area in the shoulder of a truck tire where a maximum amount of bending or flexing takes place. This area may be very narrow or sharp, depending upon the design and construction features of the tire. In a well designed tire, this area of maximum flexing is spread over a greater width than in a tire of inferior construction. In nylon tires, discoloration on the interior of the tire develops along this area of maximum flexing. The intensity of the heat-build-up and the sharpness of the flex line control the appearance of the discoloration or heat band which may vary in appearance from a light reddish brown to nearly black and vary in width from ½ to 3 inches or more. In a well designed tire, heat bands may not appear or if they do appear they may be relatively broad and indistinct. In better designed tires the heat bands are very broad and have indistinct edges and in some instances the two heat bands may actually grow so broad as to unite in the tire crown, forming a continuous discolored area extending from shoulder to shoulder of the tire. In a poorly designed tire these heat bands may be concentrated in a pair of continuous narrow bands which seem to indicate a more intense condition of nylon fusion that will accordingly bring about a more rapid failure. In the field of truck tires very few nylon tires fail to develop heat bands. In the field of passenger tires only a moderately few tires actually develop inside heat bands.

A nylon tire which indicates excessive heat build-up by the above mentioned heat bands is in a state of advanced deterioration since the nylon cord has undergone some degree of chemical or physical change. Such a tire may continue to run some indeterminable period, but it is only a matter of time until it will explode. Should the heat bands appear late in the tread life, so as to enable the tire to live to be recapped, such a tire would in all probability fail prior to the time at which it might be anticipated to wear out.

Nylon fusion may be attributed to any combination of several factors that result in a change in the cord, as a consequence of long time exposure to temperatures generated by the running tire. One, the nylon cord can be undergoing both a chemical and physical change. Two, the dip coat that acts as the bond between the nylon filaments and the rubber skim compound can be undergoing such a change. Or, three, the rubber compound adjacent to the individual cords can be undergoing a selective aging process that results in a hardening of the commpound. Any combination of these factors is termed nylon fusion. It is known that the nylon cord on the leading edge of the bias cord loses half its tensile strength under some conditions of service which loss may also be a manifestation of the fusion process.

It is evident that the focal point of attack along the flex line starts with the inside ply of a tire and that this failure progresses outward through the tire, that is, towards the ply adjacent the tread. Once the attack starts, it proceeds at an increasingly rapid rate until the internal pressure exceeds the external strength of the tire, whereupon the tire explodes without warning, dismembering the tire along the flex line heat band. The nylon apparently loses a large portion of its strength in the inside ply with each successive ply losing a little less strength as the deterioration progresses from the inside to the outside of the tire.

SUMMARY OF THE INVENTION

This invention relates to pneumatic tires and more particularly to an improved reduced ply tire which may be either radial or bias constructed. The improved tire includes a reinforcement means in the form of a mini-ply located adjacent to the outer periphery of the main carcass plies and within the shoulder area of the tire. The reinforcement means includes a strip located in each shoulder and circumferentially extending about the tire and parallel to the equatorial plane thereof. The reinforcing means increases the structural integrity of the tire where experience shows the tire will ultimately fail, with the mini-ply being coextensive with the main carcass plies and to the lateral dimension of the read portion of the tire. The mini-ply therefore provides two spaced apart narrow retaining bands which add stiffness and stability to the tire. Since the performance and profile of the tire can be considerably influenced by controlling the design of the mini-ply, control of the tread wearing surface and reduced cord strength loss can be attained.

The mini-ply is adaptable to either the bias or radially constructed tire wherein the mini-ply is substituted for or used in place of various conventional elements of the tire. For example, one form of the invention sets forth a radially constructed tire having one or more radial plies therein and with the mini-ply replacing the conventional girdle belt. In another embodiment of the invention, a 4-ply truck tire is provided with mini-plies wherein each of the pair of plies constituting the mini-ply is fabricated from a multiplicity of built up individual plies. A still further embodiment of the invention constitutes the insertion of the mini-plies between the radial body and the girdle belt at the edge of the girdle belt.

With the foregoing in mind, it is an object of the present invention to provide an improved pneumatic tire which solves many of the above inherent problems of a reduced ply tire.

Another object of the present invention is the provision of a radially constructed tire having reinforcing means in the form of a mini-ply which forms or takes the place of the usual girdle.

Another object of the present invention is to provide a reinforcing means in the form of a mini-ply which is located in the buttress near the shoulder area for improving the performance of a pneumatic tire.

Another object of the present invention is the provision of a mini-ply in the form of a pair of reinforcing strips or limited width, wherein each strip is spaced apart and located in the shoulder of a tire.

A further object of the present invention is the provision of a tire having spaced apart narrow reinforcing strips of bias construction located in each shoulder thereof and which are coextensive with the carcass plies thereof and which cooperate with the carcass ply to increase the durability of the tire.

A still further object of the present invention is to provide a tire having reinforcing strips coextensive with the main carcass ply with adjacent plies of each reinforcing strip being arranged with respect to each other to thereby impart predetermined desirable properties into the tire in accordance with the present invention.

Still another object of the present invention is the provision of spaced apart reinforcing means located between the radial plies and the circumferentially extending girdle belt of the radially constructed tire.

A still further object of the present invention is to improve the durability of the tire by the provision of a new article of manufacture comprised of a bias constructed tire having a mini-ply located in the shoulder area, thereof.

A still further object of the invention is to permit equivalent or increased reinforcement to be built into a tire with an actual decrease in the bulk of the tire.

A still further object of the invention is to impart stiffening of the supporting sidewall of the tire by inserting mini-plies between the regular full length plies in the sidewall section of the tire.

Another object of the invention is to impart asymmetry to a tire in order to achieve a required degree of sidepull within the tire.

A still further object of the invention is to build a unidirectional symmetrical tire.

A still further object of the invention is to build a tire with reduced shoulder rib wiping tendencies.

A further object of the invention is to impart a more gradual bending angle to the tire at the juncture point of the tread contact footprint with the supporting sidewall of the tire without materially increasing the bulk of the tire.

A still further object of the invention is to permit an odd number of plies to be employed in the building of a bias constructed tire while still maintaining tire and cord symmetry.

A still further object of the inventor is to permit an odd number of plies to be employed in the belt or girdle constructing of a belted tire while still maintaining tire and cord symmetry.

The above objects are attained in accordance with the present invention by the provision of reinforcing strips situated exteriorly of or within the carcass plies and coextensive therewith which add to the structural integrity of the tire.

BRIEF DESCRIPTION OF THE DRAWINGS

FIG. 7 illustrates the prior art while FIG. 8 illustrates the tread stock which may be used with the present invention;

DESCRIPTION OF THE PREFERRED EMBODIMENTS

Figure 1:
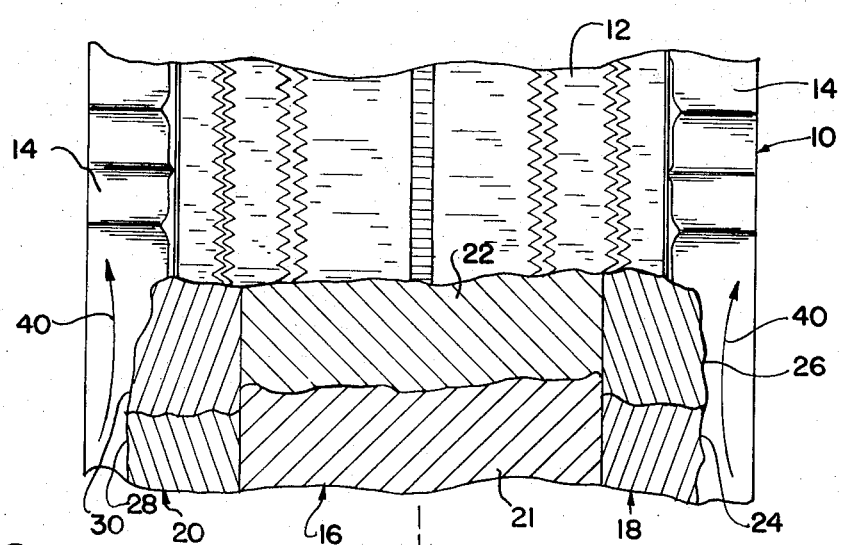
FIG. 1 is a plan view of a tread portion of the pneumatic tire made in accordance with the present invention, with portions removed to illustrate the novel features of construction therein.

Looking now to the details of the drawings, wherein similar numerals refer to similar elements wherein possible, there is seen therein some particular aspects of the invention as it may be embodied in a pneumatic tire 10, 110, or 210. The tire includes the usual tread 12 fabricated from a suitable tread wearing compound, and includes a carcass 16 built up of a pair of oppositely biased plies. Located within either shoulder of the tire are the mini-plies of the present invention. The mini-plies are comprised of a pair of spaced apart reinforcing strips 18 and 20 which are located adjacent to the carcass ply and circumferentially extend about the tire in a manner substantially as illustrated in the drawings. A single strip or mini-ply as depicted is FIG. 4L, if used, would be located at some point within the tire body not symmetrical with respect to the two beads.

For purpose of illustration, the carcass plies or FIG. 1 are seen to be fabricated from two oppositely biased plies 21 and 22. The term "bias constructed carcass plies" is intended to comprehend an angle of 20° to 70° with respect to the equatorial plane 11 of the tire, with 45° being considered optimum for the illustrated construction. It should be understood that a single ply or more than two plies may be used in fabricating the carcass plies, and that only two plies are shown merely to simply this discussion.

The before mentioned reinforcing strips of the mini-plies are each shown as being comprised of an inner ply 24 having a bias angle of 20° and an outer ply 26 having an oppositely biased cord arrangement at an angle of 20°. The reinforcing strips at 20 are mirror images of the strips seen at 18 and include oppositely biased plies 28 and 30 also arranged at approximately 20° with respect to the equatorial plane of the tire. Such a tire would be multi directional and symmetrical. If reinforcing strips 26 and 30 were to be removed leaving only strips 24 and 28, the tire becomes unidirectional. If reinforcing strips 26, 28, and 30 were to be removed leaving only strip 24, the tire becomes asymmetric. An asymmetric tire is considered to be unidirectional.

Figure 2:
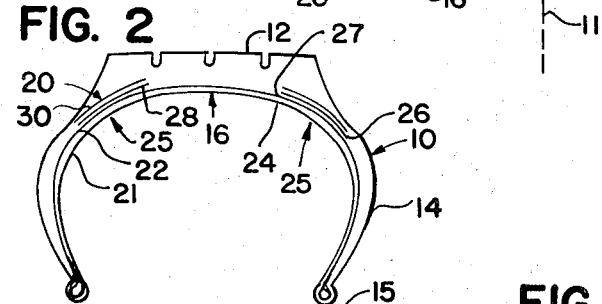
FIG. 2 is diagrammatical representation of a cross section of the tire seen in FIG. 1 which illustrates the relative position of the various elements of a tire made in accordance with the present invention.
Figure 3:
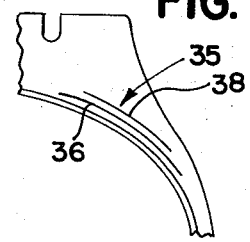
FIG. 3 is a fragmentary representation of a tire cross section, similar to the illustration of FIG. 2.

FIG. 3 shows a modification of the mini-ply seen in FIGS. 1 and 2, wherein each set of reinforcing strips is located in the shoulder area as seen at 35, and in a manner illustrated in FIGS. 1 and 2, but with the innermost or first reinforcing strip 36 being wider than the outermost or second reinforcing strip 38 to thereby provide a step-down arrangement of the strips with respect to the main carcass plies.

Figure 4:
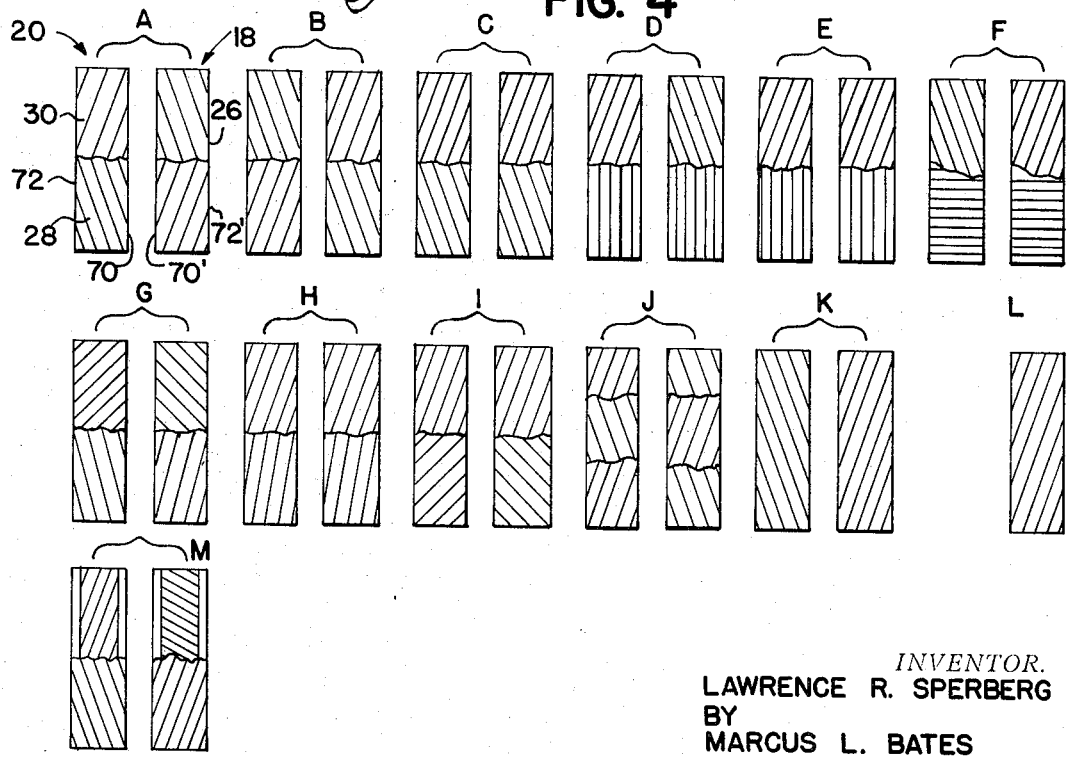
FIGS. 4A through 4M is a schematical representation of the arrangement of the reinforcing strips similar to the ones seen in FIGS. 2 through 3; which sets forth a multiplicity of tires fabricated in accordance with the present invention.

Looking now to the details of FIG. 4, there is seen schematically illustrated therein various other configurations of the before illustrated reinforcing strips 18 and 20 which form the mini-ply, with the innermost right hand strip 24 and the outermost strip 26 corresponding to the reinforcing strips 24 and 26 seen in FIGS. 1, 2 or 3; and with the inner and outermost reinforcing strips 28, 30 or FIG. 4A corresponding generally to the strips 28, 30 or FIGS. 1, 2, and 3. The various schematical representations 4A through 4M are presented in order to exemplify in a non-exclusive manner some of the various ply arrangements of the reinforcing strips.

Since FIG. 4A has already been described in detail, those skilled in the art should now realize that FIG. 4B sets forth a reinforcing ply arrangement wherein the inner and outermost bias constructed plies of the individual spaced apart strips are mirror images of one another and arranged oppositely to the strips illustrated in FIG. 4A. When the two mini-plies in one shoulder are equally and oppositely biased to each other and a mirror image of the two mini-plies in the other shoulder, the resulting tire is nondirectional. When the two mini-plies in one shoulder are biased with respect to each other but at different angles and are balanced by mirror image mini-plies in the opposite shoulder the tire becomes unidirectional.

FIG. 4C sets forth a reinforcing strip arrangement wherein each pair of the spaced apart strips are oppositely biased with respect to each other, but instead of being mirror images of each other, the spaced apart strips are fabricated to deliberately provide the tire with an unsymmetrical construction which results from each of the corresponding plies of each strip of the mini-ply being biased in the same direction with respect to each other.

FIG. 4D sets forth reinforcing means comprised of strips having plies which are mirror images of each other, but with the innermost ply of a strip having a bias angle near zero and with the outermost ply of the strip having a bias angle of about 20°.

FIG. 4E illustrates still another arrangement of the spaced apart plies of the mini-ply wherein the innermost ply of the individual strips is near a zero biased angle while the outermost plies of the strips are biased in the same direction.

FIG. 4F sets forth a construction wherein the innermost ply of each strip is radially constructed while the outermost ply is biased oppositely to that seen in FIG. 4D.

FIG. 4G sets forth a construction wherein the innermost ply of each strip is oppositely biased with respect to each other and formed at a bias angle of about 15°, while the outermost ply of each strip is biased at 45° and in an opposite direction with respect to each other.

FIG. 4H illustrates a construction wherein the inner and outermost plies are biased in the same direction with respect to each other and to the corresponding plies of the remaining strip.

FIG. 4I sets forth a construction wherein the innermost plies are oppositely biased at 45° with respect to each other while the outermost plies are biased at 20° and in the same direction with respect to each other.

FIG. 4J sets forth a construction wherein the innermost plies are oppositely biased at 45° with respect to each other, the middle plies are oppositely biased at 30° with respect to each other, while outermost plies are biased at 38° with respect to each other.

FIG. 4K sets forth a construction wherein only one ply is employed with the two mini-plies oppositely biased at 60° with respect to each other. A tire fabricated with this construction would be unidirectional and symmetrical.

FIG. 4L illustrates a single reinforcing strip in one shoulder which imparts asymmetry to the tire.

FIG. 4M shows two plies wherein the innermost plies are biased equally and oppositely with respect to each other while the outermost plies while biased with respect to the innermost ply are not equally and oppositely biased with respect to each other. This type of construction imparts a lateral force to the tire.

It is further pointed out that when the mini-plies are placed between the normal full plies of a tire the cord angles of the mini-ply must be such that they are not parallel to either of the adjacent plies.

Figure 5:
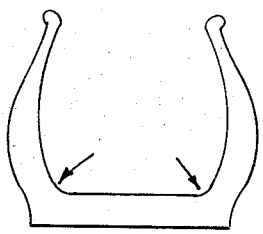
FIGS. 5 and 6 schematically illustrate one change in the bending angle of a tire which results from using the present invention.
Figure 6:
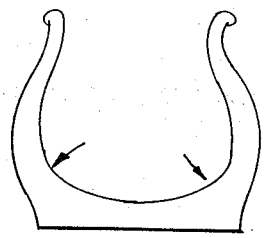

FIGS. 5 and 6 set forth a comparison between the prior art reduced ply tire and the present invention, wherein FIG. 5 illustrates the prior art while FIG. 6 illustrates one improvement derived from the use of the present invention. As seen in FIG. 5, as the flexible ply tire contacts the ground, a footprint is formed with the shoulder edge of the tire making a severe sharp angle breakaway as indicated by the arrow, creating a sharp hinge effect.

FIG. 6 illustrates the improvement which the present invention provides over the prior art of FIG. 5. As seen in FIG. 6, the width of the footprint is substantially the same as the footprint of the beforementioned tire; however, the shoulder edge of the tread surface breaks away from the footprint in an arcuant manner as indicated by the arrow. The beneficial effect of the mini-ply as illustrated by comparing FIG. 5 to FIG. 6 shows the mini-ply addition to result in a gentle curve spaced over a distance in contrast to the sharp bend or hinge of the prior art.

Figure 7:
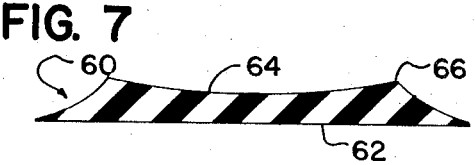
FIGS. 7 and 8 each show a cross sectional representation of the uncured tread stock before it has been applied to the outer peripheral surface of the tire during the tire building process, and where
Figure 8:
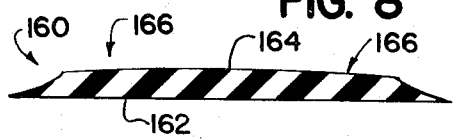

Looking now to the details of FIGS. 7 and 8 there is illustrated therein a cross sectional view of the uncured thread stock 60 as it appears prior to fabrication of a pneumatic tire. As seen in FIG. 7 surface 62 is adapted to be placed in face to face relationship upon the outer peripheral surface of the outermost ply. Curvature 64 provides an abundance of material at innerside 66 corresponding to shoulder ribs of a tire. In contrast to FIG. 7, FIG. 8 sets forth the cross sectional appearance of the tread stock which is to be used in conjunction with the present invention when the mini-plies are located in the upper buttress and outside ribs of the tires. As seen in FIG. 8 tread stock 160 has less material at edge portions 166 as compared to the center portion 164 of the stock. When placed upon the green tire during the tire building process the presence of the mini-ply in conjunction with the tread stock 160 results in the final desired configuration without increasing the bulk of the tire.

Figure 9:
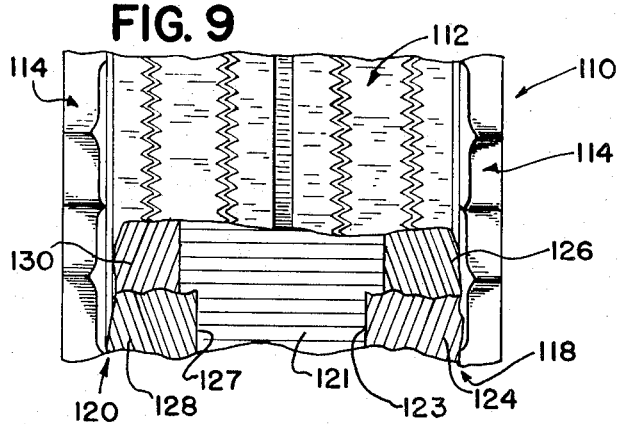
FIG. 9 is a plan view of the tread portion of a pneumatic tire made in accordance with the present invention, and with portions thereof removed in order to illustrate the novel feature of construction appearing therein.

FIG. 9 sets forth a modification of the bias constructed tire of FIG. 1. As seen in the radially constructed tire 110, the mini-plies are spaced apart in the illustrated manner seen at 118 and 120, and in the before described manner of the bias constructed tire of FIG. 1, except that the mini-plies are exclusively under the shoulder ribs. The radial plies which make up the main carcass of the tires are seen at 121 with the mini-plies overlying the right and left hand portions of the radial carcass plies. Each spaced apart strip 118, 120 which forms the mini-ply is shown as being comprised of two bias constructed strips 124, 126 and 128, 130 for purpose of illustration only. The edge portion of the mini-ply is seen at 123, and 127 while the remaining edge portions are hidden from view because of the presence of the sidewall 114. The term "adjacent edge portions" relates to 123, 127, 70, 70', while "spaced apart edge portions" relates to 72, 72'. The radial belted tire as depicted in FIG. 9 has the advantage of offering improved cushioning to irregularities on the road surface while still retaining excellent directional stability. The improved cushioning refers to the property of a tread to envelope protruding objects without imposing the extreme shear forces imposed upon the cords as occurs in tires of the prior art. The illustrated tire also posses a softer ride than radial belted tires of the prior art. While FIG. 9 shows only two mini-plies within the outer shoulder, additional plies are contemplated if required for any reason.

Figure 10:
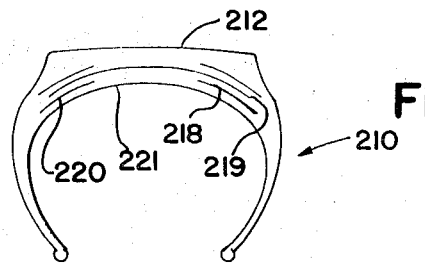
FIG. 10 is a cross sectional schematical view of another embodiment of the invention.

FIG. 10 depicts both a two ply conventional biased tire as well as a radial tire wherein the mini-plies are inserted between the two main carcass plies. The angle of the cord of the mini-ply should be such that it does not lie parallel to either of the adjacent plies.

Figure 11:
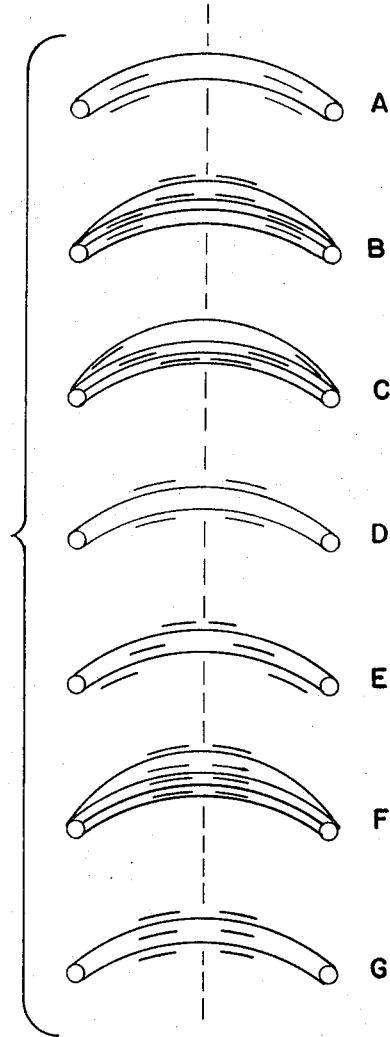
FIG. 11 is a simplified plan view of several embodiments of the invention wherein both preferred and less desirable means of practising the invention are depicted.

FIG. 11 shows various arrangements and locations of the mini-ply appearing in both sidewalls, buttress, and shoulder areas in staggered as well as in aligned relationships with respect to one another. An aligned relationship of multiple mini-plies is to be avoided generally wherein the mini-plies are inserted between regular plies of a tire due to possible malalignment of the individual cords of the main cord structure. When mini-plies are aligned with respect to each other, on the interior or exterior of the main cord body of the tire, no such objection exists.

OPERATION

The present invention may be practiced in conjunction with either a bias or a radially constructed tire, wherein each possible basic tire design includes several different embodiments thereof. In carrying out the present invention the reinforcing strips are sometimes added to the outer periphery of the outermost ply of the main carcass, while the tire is being built upon the tire building drum. The tire is subsequently placed in the mold and expanded into its final configuration in the usual manner. The reinforcing strips are placed in the general area indicated by the arrow at numeral 25 since this area of the tire receives the maximum flexing as evidenced by heat build-up and flex lines in the conventional more flexible reduced ply constructed tires. The materials of construction of both the main carcass 16 and reinforcing means 18 and 20 may be selected from either natural or synthetic fibers, including the extrudable polyamides, fiberglass, rayon, polyester, polyolefins, wire, as well as any other recognized tire building fiber.

Looking again now to the details of FIG. 2, each of the reinforcing means 18 and 20 is seen to be spaced apart from each other and from the bead 15 so as to form two spaced apart isolated strips extending circumferentially about the outer peripheral surface of the main carcass plies and parallel to the equatorial plane of the tire. The width of each reinforcing strip or mini-ply as illustrated in the specific example of FIG. 2 is not a constant dimension but depends upon the size and type tire being reinforced and the specific reinforcement required.

As seen in FIGS. 4A, 4B, 4G, and 4J, each of the individual plies associated with each of the spaced apart strips of the mini-ply may be biased with respect to each other. For a conventional tire these strips are generally mirror images of one another in order to maintain symmetry of the tire structure. In some instances, however, it is advantageous to fabricate the tire into an unsymmetrical structure to thereby provide an asymmetrical tire as illustrated in FIGS. 4E, 4H, 4I, 4L, and 4M. This expedient enables advantage to be taken of the asymmetrical aspects of the tire structure in order to provide the tread wearing surface of the tire with the desired sidepull.

As further seen in 4D, 4F, 4J, and 4K a unidirectional tire may be fabricated wherein the tread portion which contacts the ground may be either compressed or pulled apart depending upon the rotational direction of the tire with respect to the design of the mini-ply, as well as the relationship of the cord angles which each mini-ply makes with respect to an equatorial line extending circumferentially around the tire.

As seen in FIG. 4J, it is unnecessary to have even numbers of plies in each of the reinforcing strips for the reason that each strip can contain any number of plies and yet be fabricated as a mirror image of the other, and when placed in each opposite shoulder of a tire, the tire is symmetrically distorted to thereby enable further control of the tire profile. This feature of the invention enables close control of the wear properties of the tire. By properly selecting the bias angle of the plies of each strip, and their relationship to each ply of the other strip, the poor wearing qualities of any tire can be improved along with the addition of greater stability.

It is well known to those skilled in the art that there are many acceptable tire cord materials. These materials encompass rayon, nylon, polyester, fiberglass and wire to enumerate the most widely used types. Each type cord material is available in a variety of sizes, twist, and ends per inch. The present invention envisions using any of these materials. The choice of cord type, size, and ends per inch will be regulated by the nature of the problem being solved.

The advantages in controlling the tire profile in order to eliminate flex fatigue of the cord material is illustrated in FIGS. 5 and 6. FIG. 5 exemplifies the sharp bend or hinge which occurs as the tread contacts the ground at the tread shoulder and sidewall juncture of the tire footprint. With each rotation of the tire as the hinge opens and closes, every tire cord and the rubber insulation compound encompassing each cord are subject to a series of bending, torsional, extension and compression forces. The major portion of the power loss within a flexing tire body occurs at the two shoulder hinge points. This power loss is manifest as an increased temperature which brings about deterioration due to oxidation and fatigue. Fatigue deterioration results when applied stresses exerted on the elements of a tire exceed the endurable limits. The reinforcement or stiffening of the flex area of each shoulder by incorporating the reinforcing strip of the present invention into the tire to encompass the flex area only, results in a change of the bending profile of the tire such as may be seen in FIG. 6. The presence of the mini-ply decreases the sharpness or severity of the bend thereby reducing the magnitude of the bending angle or flex action where the tread shoulder breaks away from the ground.

The addition of the mini-ply does not increase the bulk of the tire for the reason that each of the spaced apart strips merely displaces the rubber tread stock which was previously located where the mini-ply is now positioned. In order to accomodate the physical presence of the mini-ply, the cross sectional configuration of the uncured tread stock may be modified from the illustration of FIG. 7 to that of FIG. 8, wherein reduction of tread stock in the general area illustrated by numeral 166 will compensate for the presence of the mini-ply. Therefore, tire thinness is not sacrificed for tire stiffness.

In the embodiment of FIG. 9, the mini-ply is placed in the same relative position as discussed in conjunction with FIGS. 1 through 4 but wherein the main plies of the carcass 121, are of radial construction. The mini-ply in this instance is somewhat wider so as to encompass the shoulder flex area as well as extending under the entire shoulder rib. The number of plies 121 as well as the number of individual plies associated with each strip 120, 118 of the mini-ply may be selected according to the final purpose or design intention necessary for the particular tire.

In the embodiment of the tire illustrated in FIG. 9 the mini-plies in each shoulder area effectively become two separate belts or girdles extending circumferentially around the tire. The advantage of such a tire is its greater cushioning property in the crown area in contrast to the prior art belted girdle type tire wherein the belt extends across the entire tread wearing surface.

In conventional prior art belted radial type tires, two or more belt plies, or girdles are placed adjacent to and between the radial plies and the tread. In the more recently developed belted bias type tires, two or more belt plies are placed adjacent to and between the bias plies and the tread. The belt or girdle extends from one shoulder of the tire to the other shoulder. FIG. 10 depicts such tires containing a belt or girdle 219, a tread 212 and a body or carcass 221 which may be either a radial or a bias cord construction. Mini-plies 218 and 220 are inserted between body 221 and belt 219 in the manner shown. While FIG. 10 shows the mini-ply being between body 221 and belt 219 it is emphasized that one edge of the mini-ply may be inserted between the plies of belt 219 or on top of belt 219 while the other edge extends over the body 221.

It will be evident to those skilled in the art, having now read the foregoing disclosure, that a mini-ply fabricated from a single bias constructed ply may have the cord angle thereof selected to provide several different predetermined results. For example, a strip fabricated from a single bias ply, with each spaced apart strip being mirror images of each other, may be arranged at an angle with respect to the equatorial plane of the tire to cause the unidirectional effect to be either pronounced or minimized—i.e., to either stretch the footprint inwardly or outwardly, markedly or slightly, dependent upon the direction of rotation of the tire. This constructional feature brings about a unidirectional tire, and accordingly, indicia such as arrows must be placed on or molded onto the tire to assure proper mounting of the tire with respect to the direction of rotation of the wheel. This is exemplified at 40 in FIG. 1.

On the other hand, where the biased angle of adjacent plies of a strip are equal and opposite to one another, and each of the two spaced apart strips are mirror images of each other, the necessity of maintaining a given direction of rotation of the tire is of lesser importance since the tendency of the tread to be pulled apart or compressed is independent of the direction of rotation.

Since the addition of the reinforcing strips in each shoulder need not be accompanied by an increased thickness of the tire body, the inherently cooler running characteristic of the thinner walled reduced ply tire is maintained while the advantage of increased stiffness of the multi-ply tire is gained, and a more diffuse, broader bend line and improved wear characteristics are realized from the present invention.

Where extreme rigidity of sidewall is required, as for example in airplane tires, the addition of the reinforcing strips in the tire sidewall results in much greater rigidity with only slight increase in bulk. The increase in sidewall rigidity permits lower inflation pressures which in turn results in greater envelopment potential for the tread when encountering stones on the runway surface.

It is contemplated to use materials of construction other than those set forth herein in fabricating both the main carcass ply as well as the plies of the reinforcing strip. It is considered that experimentations with various extensible and non-extensible natural and synthetic fibers placed in various different patterns throughout the construction set forth herein will provide a pneumatic tire having various desirable features which have not heretofore been known. Accordingly, all such modifications and changes are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In a pneumatic tire having spaced beads, a tread portion, a main carcass ply which extends from bead to bead to form a sidewall and which supports the tread portion, with said sidewall including a shoulder area thereon, the improvement comprising:
   two mini-plies for imparting structural rigidity into the main carcass ply; each of said mini-plies being comprised of an individual circumferentially extending reinforcing strip lying parallel to one another and adjacent to the main carcass ply;
   each of said mini-plies being spaced apart from each other and from the equatorial plane of the tire and from the tire beads and positioned in the shoulder region so as to decrease the bend point in the shoulder area as the tire contacts a supporting surface;

each of said mini-plies including two superimposed oppositely biased individual plies of tire cord material disposed at unlike angles relative to the equatorial plane of the tire.

2. In a pneumatic tire having spaced beads, a tread portion, a main carcass ply which extends from bead to bead to form a sidewall and which supports the tread portion, with said sidewall including a shoulder area thereon, the improvement comprising:

two mini-plies for imparting structural rigidity into the main carcass ply; each of said mini-plies being comprised of an individual circumferentially extending reinforcing strip lying parallel to one another and adjacent to the main carcass ply;

each of said mini-plies being spaced from each other and from the equatorial plane of the tire and from the tire beads and positioned in the shoulder region so as to decrease the bend point in the shoulder area as the tire contacts a supporting surface;

each of said mini-plies including two superimposed oppositely biased individual plies of tire cord material;

said main carcass ply is comprised of a radially constructed ply and further includes a belt ply supported by said radially constructed ply; each said oppositely biased mini-ply being spaced apart from one another by said belt at one edge portion thereof, and being placed in contact with one another at the remaining edge portion thereof;

said oppositely biased individual plies of each mini-ply being disposed at unlike angles relative to the equatorial plane of the tire.

3. The improvement of claim 2 wherein said main carcass ply includes at least two radial plies.

4. The improvement of claim 2 wherein said main carcass ply includes at least two radial plies, and one ply of one of said mini-plies is located between said radial plies.

5. The improvement of claim 2 wherein said oppositely biased individual plies of one said mini-ply are disposed at unlike angles relative to the corresponding ply of the remaining said mini-ply.

6. A radially constructed pneumatic tire which includes spaced beads, a tread wearing portion, at least two radial body plies affixed to the beads and supporting the tread and a belt ply;

at least one added mini-ply made of two oppositely biased plies of parallel cords, said cords being continuous from edge portion to edge portion of each said ply and circumferentially disposed for 360° about the tire, said parallel cords forming polygons with respect to the adjacent cords of said radial ply of the tire body;

said cords of said mini-ply extending from under the shoulder area of the tread and terminating in close proximity to the mid-sidewall of the tire thereby imparting rigidity to the tire cord body and increasing the radius of the bending angle formed as the tire rolls through its footprint as compared to the bending angle formed by a tire having no added mini-ply;

said edge portions of said added ply cord being spaced from one another, from the beads, and from the equatorial plane of the tire;

one ply of said mini-ply being located between said two radial plies, another ply of said mini-ply being located between said belt ply and one said radial ply.

7. The tire of claim 6 and further including adding to said ply structure a second said mini-ply made of parallel cords, said second mini-ply having the cords thereof arranged into a mirror image of the cords of the first said mini-ply, said second mini-ply being located in the shoulder opposite the location of the first said mini-ply.

8. The tire of claim 2 wherein said mini-ply has one ply thereof located between said belt ply and said radial ply.

9. The tire of claim 2 wherein said tire includes at least two radial plies;

one ply of said mini-ply being located between said two radial plies, another ply of said mini-ply being located between said belt ply and one said radial ply.

10. The tire of claim 1 and including a belt ply arranged adjacent to said main carcass ply and in overlapping relationship respective to a marginal edge portion of said mini-ply.

11. The improvement of claim 1 wherein said main carcass ply is comprised of a single radially constructed ply and further including a belt ply supported by said radially constructed ply; each said oppositely biased mini-ply being spaced apart from one another by said belt ply at one edge portion thereof, and being placed in contact with one another at the remaining edge portion thereof.

12. The improvement of claim 2 wherein said oppositely biased individual plies of one mini-ply are disposed at unlike angles relative to the corresponding ply of the remaining mini-ply.

13. The improvement of claim 1 wherein said main carcass ply is comprised of a single radially constructed ply and further including a belt ply supported by said radially constructed ply; each said oppositely biased mini-ply being spaced apart from one another by said belt ply at one edge portion thereof, and being placed in contact with one another at the remaining edge portion thereof;

wherein said oppositely biased individual plies of one mini-ply are disposed at unlike angles relative to the corresponding ply of the remaining mini-ply.

* * * * *